US006604972B1

(12) United States Patent
Yamano

(10) Patent No.: US 6,604,972 B1
(45) Date of Patent: Aug. 12, 2003

(54) IMAGE DISPLAY APPARATUS MANUFACTURING METHOD

(75) Inventor: Akihiko Yamano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 361 days.

(21) Appl. No.: 09/704,759

(22) Filed: Nov. 3, 2000

(30) Foreign Application Priority Data

Nov. 5, 1999 (JP) .......................................... 11-315155
Oct. 30, 2000 (JP) ...................................... 2000-330435

(51) Int. Cl.[7] .............................. H01J 9/24; H01J 1/62; C08J 7/18; H05H 1/00

(52) U.S. Cl. ......................... 445/24; 427/532; 427/537; 427/64; 313/495; 313/496

(58) Field of Search ........................... 445/24; 313/495, 313/497; 427/64, 532, 540

(56) References Cited

U.S. PATENT DOCUMENTS

| | | | | | |
|---|---|---|---|---|---|
| 3,071,490 A | * | 1/1963 | Pevar | 427/540 |
| 3,711,311 A | * | 1/1973 | Esseiva et al. | 427/540 |
| 4,284,662 A | * | 8/1981 | Matsuzaki et al. | 427/68 |
| 4,339,475 A | * | 7/1982 | Hinosugi et al. | 427/64 |
| 4,661,370 A | * | 4/1987 | Tarrant | 427/540 |
| 5,451,835 A | | 9/1995 | Yamazakai et al. | |
| 5,936,342 A | | 8/1999 | Ono et al. | |

FOREIGN PATENT DOCUMENTS

| | | |
|---|---|---|
| WO | 00/440222 | 7/2000 |

* cited by examiner

*Primary Examiner*—Kenneth J. Ramsey
*Assistant Examiner*—German Colón
(74) *Attorney, Agent, or Firm*—Fitzpatrick, Cella, Harper & Scinto

(57) ABSTRACT

To provide an image display apparatus manufacturing method that enables bright, high-quality images to be displayed stably over a long period. A manufacturing method for an image display apparatus that includes a first substrate, a second substrate located at a distance from and opposite the first substrate, electron-emitting devices arranged on a principal surface of the first substrate, a phosphor film, and an electroconductive film covering that phosphor film, wherein the phosphor film and the electroconductive film are located on a principal surface of the second substrate so as to be opposite the electron-emitting devices, includes the following steps of:

(A) forming the above described phosphor film on the principal surface of the second substrate;

(B) forming a first electroconductive film covering the phosphor film;

(C) placing an electrode at a distance from-the first electroconductive film;

(D) applying a voltage between the first electroconductive film and the electrode; and (E) forming a second electroconductive film on the first electroconductive film.

4 Claims, 13 Drawing Sheets

IMAGE DISPLAY APPARATUS MANUFACTURING METHOD

BACKGROUND OF THE INVENTION

1. Field of the Invention

The present invention relates to suitable manufacturing method for an image-forming apparatus using an electron beam such as a field emission display (FED) or cathode ray tube (CRT), for example, and a face plate used in such an image-forming apparatus.

2. Related Background Art

There is a demand for much larger image-forming apparatuses such as CRTs, and a great deal of research is being carried out in this regard. As size increases, achieving thinness, light weight, and low cost of the apparatus have become major concerns.

However, as the structure of a CRT is such that electrons accelerated by a high voltage are deflected by deflecting electrodes, and irradiate a phosphor on the face plate, causing excitation, when the size is increased, depth is necessary in principle, making it difficult to achieve thinness and light weight.

The inventor has been conducting research into an image-forming apparatus using surface conduction electron-emitting devices, as an image-forming apparatus capable of solving the above described problem.

Application to a multi-electron-beam source of an electron-emitting device by means of an electrical wiring method such as that shown in FIG. 4 are disclosed in U.S. Pat. No. 5,936,342, U.S. Pat. No. 5,451,835, and WO 00/44022, etc.

The apparatus shown in FIG. 4 has a 2-dimensional arrangement of a plurality of surface conduction electron-emitting devices, and, as shown in the figure, these devices constitute a multi-electron-beam source wired in simple matrix form. FIG. 4 shows a circuit diagram for the case where surface conduction elctron-emitting devices are connected by matrix-wiring.

In the figure, reference numeral 4012 schematically indicates a surface conduction elctron-emitting device, reference numeral 4002 indicates column-directional wiring, reference numeral 4003 indicates row-directional wiring, and reference numeral 4004 indicates resistances.

For the purposes of illustration, a 6×6 matrix is shown, but the scale of the matrix is not, of course, limited to this: as many devices as are sufficient to perform the desired image display are arrayed and wired.

FIG. 5 shows the structure of a flat type cathode ray tube using this multi-electron-beam source.

In FIG. 5, surface conduction electron-emitting devices 4012 are provided on a substrate 4001, and the structure consists of a rear plate 4005 and side wall 4007, a face plate 4006 provided with a phosphor layer 4008, and an electroconductive film (so-called metal back) 4009 on the phosphor layer.

The configuration is such that a high voltage is applied to the metal back 4009 from a high voltage power supply 4010 through a high voltage input terminal 4011.

In order to output the desired electron beams, in the multi-electron-beam source in which surface conduction electron-emitting devices 4012 are simple-matrix-wired, appropriate electrical signals are applied to the column-directional wiring 4002 and row-directional wiring 4003.

For example, to drive an arbitrary row of surface conduction electron-emitting devices within the matrix, a selection voltage Vs is applied to the row-directional wiring 4003 of the selected row, and at the same time a non-selection voltage Vns is applied to the row-directional wiring 4003 of the non-selected rows.

In synchronization with this, a drive voltage Ve for outputting electron beams is applied to the column-directional wiring 4002.

According to this method, voltage Ve−Vs is applied to the surface conduction electron-emitting devices of the selected row, and voltage Ve−Vns is applied to the surface conduction electron-emitting devices of the non-selected rows.

If the size of these voltages Ve, Vs, and Vns is adjusted appropriately, an electron beam of the desired intensity is output only from the surface conduction electron-emitting devices of the selected row, and if a different drive voltage Ve is applied to each column-directional wire, electron beams of different intensity are output from each device of the selected row.

As the response speed of the surface conduction electron-emitting devices is fast, by changing the length of time for which the drive voltage Ve is applied, it is also possible to change the length of time for which the electron beam is output.

By means of the above described voltage application, the electron beams output from the multi-electron-beam source configured by surface conduction electron-emitting devices are applied to the metal back 4009 to which a high voltage Va is being applied, pass through the metal back 4009, strike the phosphor of the phosphor layer 4008, which is a target, and excite the phosphor, causing it to emit light.

Therefore, the image-forming apparatus shown in FIG. 5 becomes an image display apparatus by appropriately applying voltage signals corresponding to image information, for example.

Thus, the above described image display apparatus displays an image by applying a high voltage to the metal back 4009, generating an electric field and accelerating electrons between the rear plate 4005 and the face plate 4006, and exciting the phosphor, causing it to emit light.

Meanwhile, in order to realize a drastically thinner image display apparatus, it is necessary to reduce the distance between the rear plate 4005 and face plate 4006 shown in FIG. 5, for example.

Therefore, a considerably higher field strength arises between the rear plate 4005 and face plate 4006 than in the case of a CRT. Also, the higher the acceleration voltage, the stronger is the light emission and the greater the brightness of the image display apparatus.

The metal back 4009 is generally configured by a metal film. The reasons for this are to enable a high voltage to be applied to the entire phosphor layer, to remove charge by the metal back from the phosphor which is an insulator, and also to enable light emitted from the phosphor toward the rear (in the direction of the rear plate) to be conveyed (reflected) toward the front by means of a mirror-surface effect. It is therefore necessary for the metal back to be a continuous film with a certain degree of thickness.

As the accelerated electron beams must excite the phosphor through the metal back 4009, the thickness of the metal back 4009 is limited, although this also depends on the potential applied to the metal back.

Meanwhile, as the phosphor is generally a powder, the phosphor layer 4008 is porous and its surface has a considerable number of irregularities.

There are also a considerable number of irregularities on the surfaces of black members (such as the black matrix) provided for such reasons as preventing color mixing of the phosphor, preventing color shifting even if the beam position shifts a certain amount, and improving the image contrast by absorbing external light.

So, it is difficult to produce a continuous metal film directly on the phosphor layer with desired thickness, and so a filming step is generally used as the metal back creation step.

In this filming step, an acrylic or similar resin film is disposed on the surface of the phosphor layer, etc., and the surface of the phosphor layer, etc., is made flat. On the flattened film (resin film), a metal film is formed by means of vacuum evaporation, etc., and then the resin film is thermally decomposed and eliminated by baking, as a result of which the metal film is attached to the phosphor layer, creating the metal back.

As the above described resin film undergoes thermal decomposition and elimination by baking after the metal film is disposed, the resin film becomes a gas, and holes through which that gas escapes are created in the metal back (metal film) (see FIG. 13). In FIG. 13, reference numeral 4006 denotes the face plate, reference numeral 2 denotes phosphor particles, reference numeral 3 denotes the metal film (metal back), and reference numeral 104 denotes protrusions formed around the holes created in the metal film (metal back). In many cases, the thicker the metal film (metal back) formed on the resin film, the more severe is the shape of these holes and protrusions 104.

SUMMARY OF THE INVENTION

However, in the case of the related background art as described above, there is a problem in that the strength of the field between the rear plate and face plate becomes high, and spark discharge may occur between the two electrodes, resulting in a deterioration in the quality of the image displayed by the image display apparatus.

With regard to the above described problem, the above described related background art will be described as an example. As stated above, spark discharge may occur when the strength of the field between the rear plate 4005 and face plate 4006 becomes high.

In this case, when the sparking voltage at which spark discharge begins to occur traverses a high-vacuum gap, the material and surface state of the electrodes have an influence.

Consequently, if the metal back has holes and protrusions, as described above, discharge between the face plate and rear plate may be induced. Also, structurally weak protrusions around holes in the metal back, etc., may fall on the rear plate side due to Coulomb's force, etc., and shorting may occur between the wires laid out in a high-density arrangement on the rear plate side.

One cause of this kind of problem lies in the holes formed in the metal back because of the use of the above described resin film, and the protrusions 104 formed around the holes, as described using FIG. 13. Consequently, when the above described holes and protrusions are created, the idea may be conceived of reducing the thickness of the metal film (metal back) formed on the resin film and decreasing the holes and protrusions 104 due to gas escape. However, there have been cases where, when the metal back is made thinner in this way, there is a drop in the conductivity of the metal back itself, or the original purpose of the metal back in reflecting light emitted from the phosphor toward the face plate can no longer be fulfilled.

Therefore, from the viewpoint of reliability and life, in practical applications the voltage applied to the metal back must be reduced, resulting in the problem of lower image quality as an image-forming apparatus, due to reduced brightness, etc.

The present invention has been implemented taking into account the actual problems described above, and it is an objective of the present invention to provide a face plate manufacturing method and image-forming apparatus manufacturing method that enable bright, high-quality images to be formed stably over a long period.

In order to achieve the above described objective, the present invention provides a manufacturing method for an image display apparatus that comprises a first substrate, a second substrate located at a distance from and opposite the above described first substrate, electron-emitting devices arranged on a principal surface of the above described first substrate, a phosphor film, and an electroconductive film covering that phosphor film, wherein the phosphor film and the electroconductive film are located on a principal surface of the above described second substrate so as to be opposite the above described electron-emitting devices, the method comprising the following steps of:

(A) forming the above described phosphor film on the principal surface of the above described second substrate;

(B) forming a first electroconductive film covering the above described phosphor film;

(C) placing an electrode at a distance from the above described first electroconductive film;

(D) applying a voltage between the above described first electroconductive film and the above described electrode; and (E) forming a second electroconductive film on the above described first electroconductive film.

DETAILED DESCRIPTION OF THE PREFERRED EMBODIMENTS

With reference to the attached drawings, the preferred embodiments of the present invention will be described in detail below. However, unless specifically stated otherwise, it is not meant that the present invention is restricted to the dimensions, materials, shape, relative location, etc., of the component parts mentioned in these embodiments.

First, one embodiment of the manufacturing method for the face plate and image-forming apparatus relating to the present invention will be described below with reference to FIGS. 1A to 1C, FIGS. 2A to 2C, FIG. 3, FIGS. 6A and 6B, FIGS. 7A and 7B, and FIGS. 8A and 8B.

Figure 3:
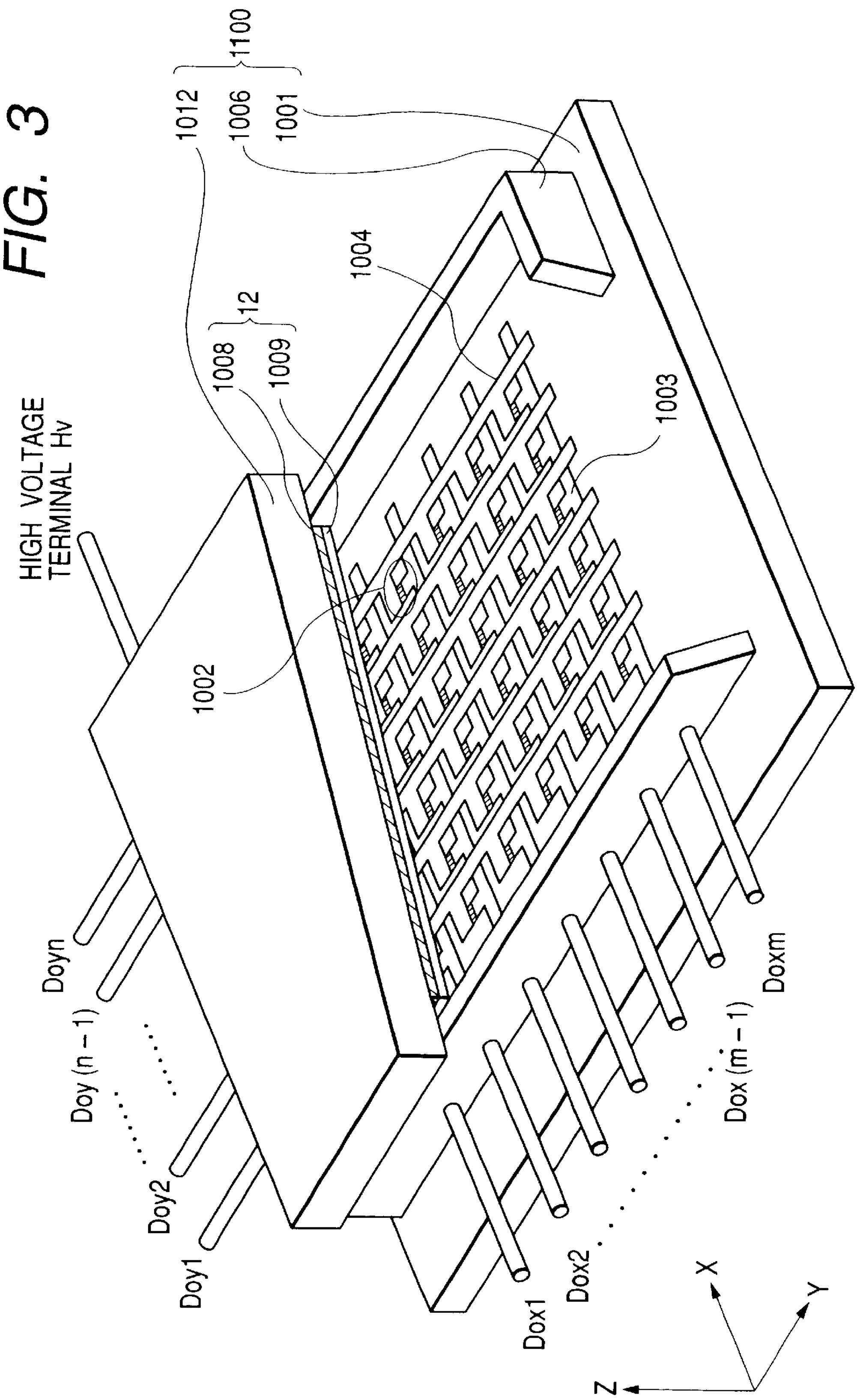
FIG. 3 is a schematic perspective view of an image display apparatus to which the present invention is preferably to be applied.
Figure 4:
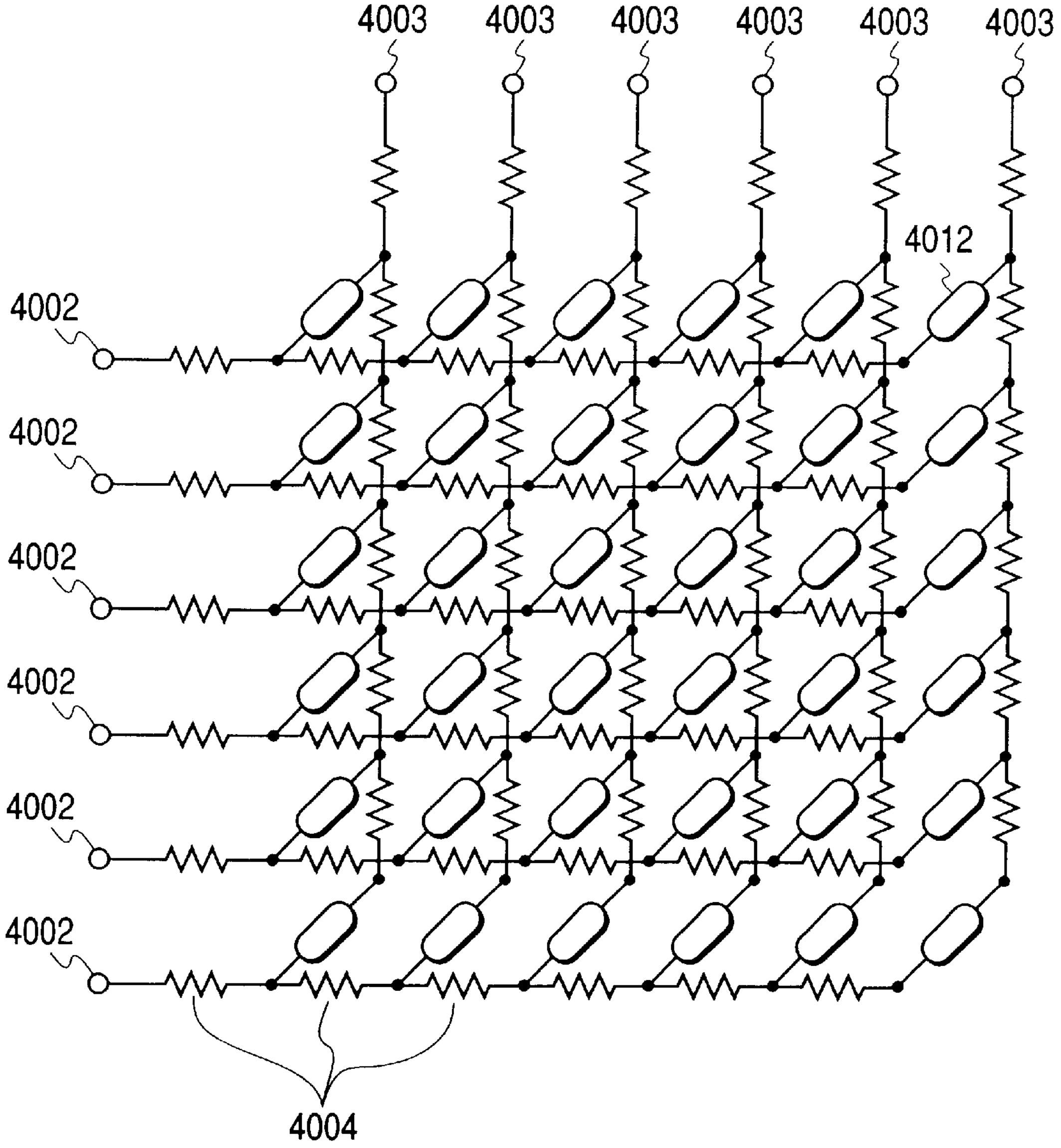
FIG. 4 is a circuit diagram of the case where electron-emitting devices are connected by matrix wiring.
Figure 5:
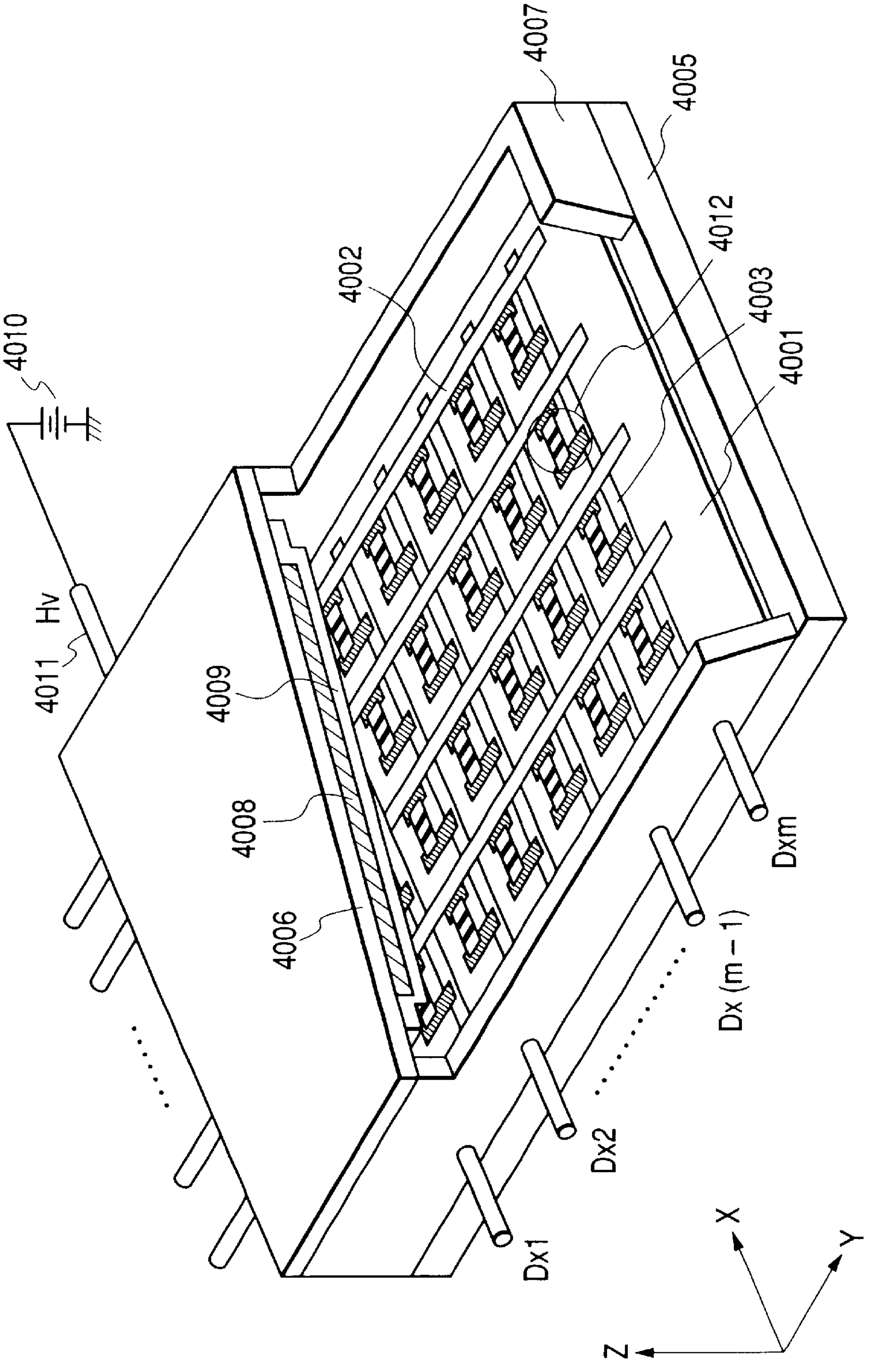
FIG. 5 is a schematic perspective view of a conventional image display apparatus.

FIG. 3 is a schematic perspective view of an image-forming apparatus (image display apparatus) manufactured by means of the manufacturing method of the present invention. Reference numeral 1001 denotes the rear plate, which has electron-emitting devices 1002, and wiring 1003 and 1004 for driving the electron-emitting devices. Reference numeral 1012 denotes the face plate, which has an image-forming member 12. When the image-forming apparatus is used as a display, the image-forming member 12 is configured by a phosphor film 1008 and an electroconductive film (metal back) 1009. Reference numeral 1006 denotes a supporting frame, which is a member for keeping the space between the face plate and rear plate in a reduced pressure state, and is also a member for maintaining the spacing between the face plate and the rear plate.

The distance between the face plate and rear plate is between 500 μm and 10 mm, with a distance of 1 mm to 5 mm desirable, depending on the angle of divergence of the beams emitted from the electron-emitting devices used. A high voltage terminal Hv is connected to the above described electroconductive film 1009.

Taking account of the distance between the above described face plate and rear plate, the thickness of the metal back, the discharge starting voltage, etc., a voltage of 1 kV to 20 kV, and preferably 6 kV to 15 kV, with respect to the rear plate potential, is applied to the metal back 1009 when driving the above described image-forming apparatus.

The metal back 1009 is set to a film thickness of 30 nm to 200 nm, and preferably 40 nm to 150 nm, in consideration of the aim of eliminating the charge of the above described phosphor by means of the metal back, the aim of having light emitted from the phosphor toward the rear (in the direction of the rear plate) conveyed (reflected) toward the front by means of a mirror-surface effect, the aim of having electrons emitted from the electron-emitting devices effectively pass through, and the range of the voltage applied to the above described metal back.

Figure 8A:
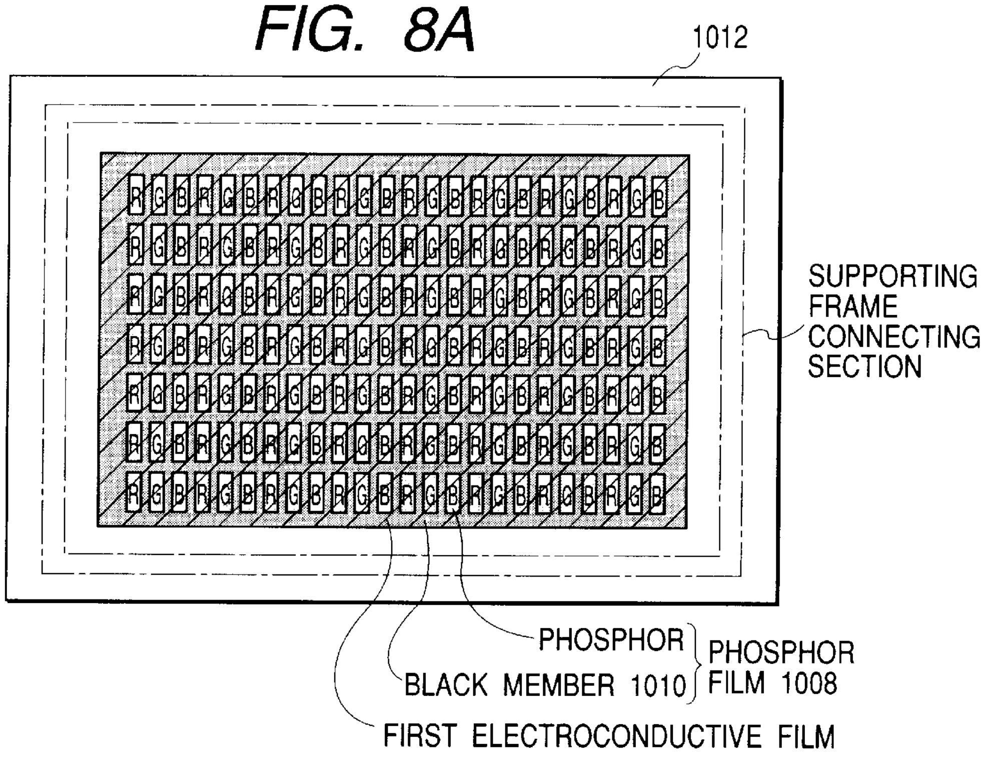
FIGS. 8A and 8B are schematic views of parts of the manufacturing process for the face plate of the present invention.
Figure 8B:
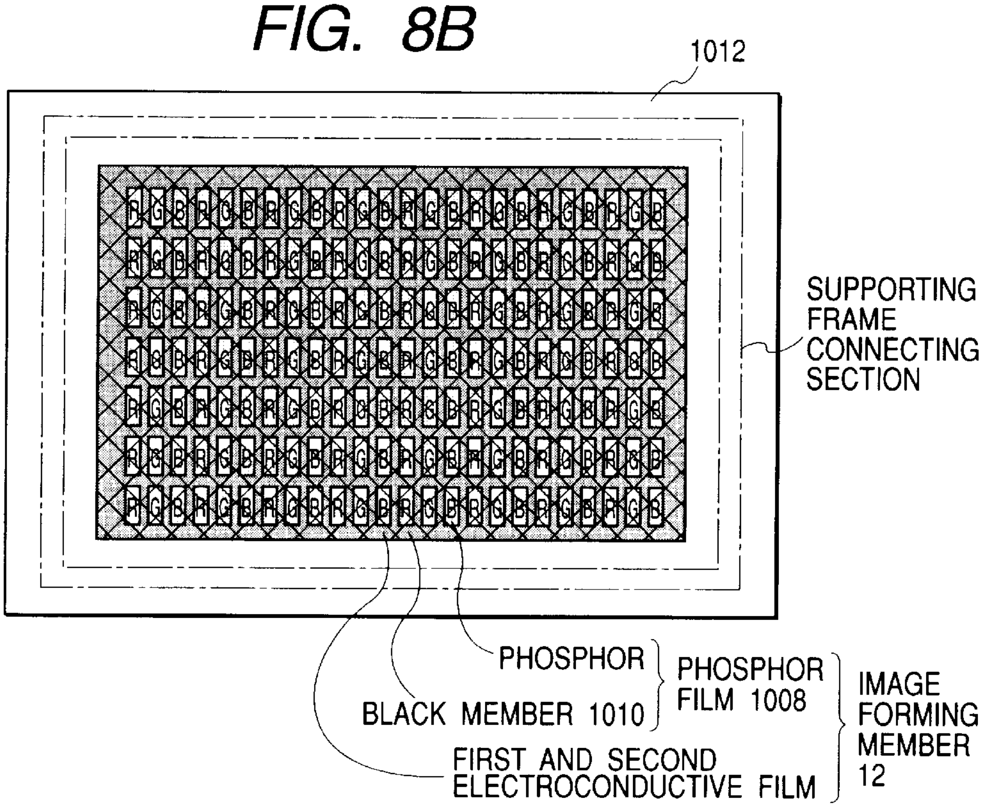

FIG. 8B is a schematic diagram for the case where the face plate 1012 manufactured according to one embodiment of the manufacturing method relating to the present invention is viewed from the rear plate 1001 shown in FIG. 3.

Figure 2A:
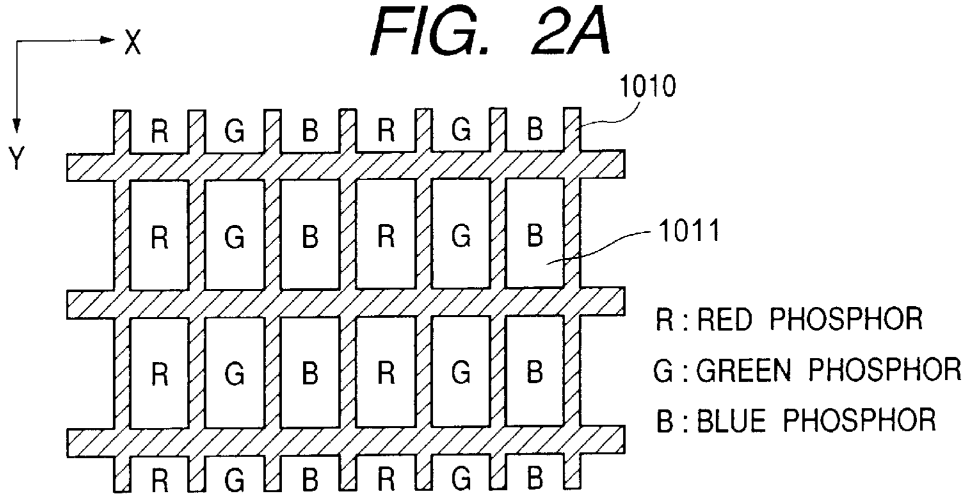
FIGS. 2A, 2B, and 2C are schematic views of examples of the pattern of the phosphor film of the present invention.
Figure 2B:
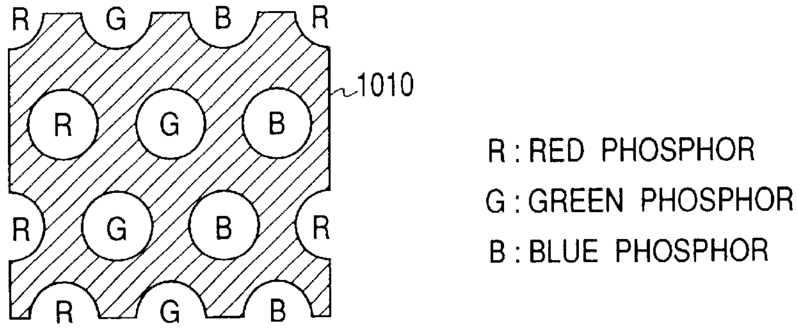
Figure 2C:
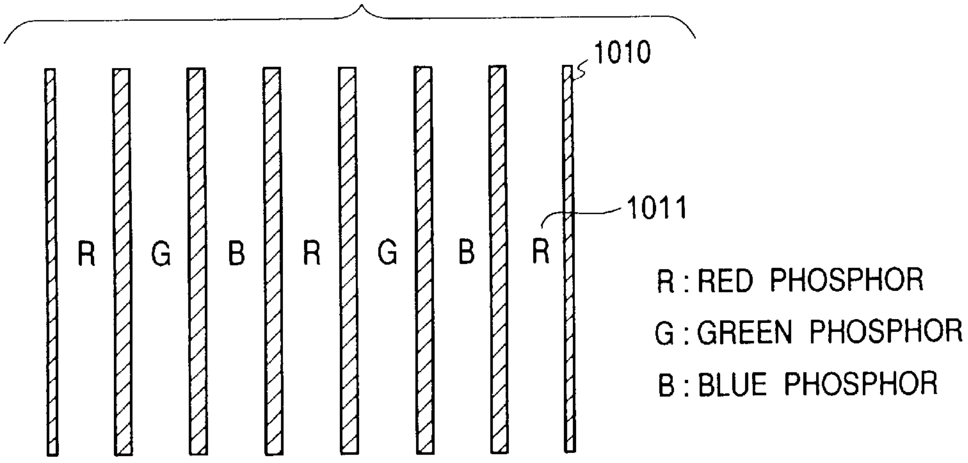

FIGS. 2A to 2C are schematic views of three kinds of patterns of the phosphor film 1008 viewed from the above described rear plate side. In FIGS. 2A to 2C, reference numeral 1011 denotes phosphors, and reference numeral 1010 denotes a black member. The phosphor film 1008 is configured by these phosphors (and black member). It is desirable for the black member 1010 to be used to prevent color mixing between the phosphors, and to improve contrast during light emission. However, the above described black member is not necessarily required. Here, three colors of phosphor emitting the three primary colors R (red), G (green), and B (blue), are used as the phosphors 1011.

FIG. 2A and FIG. 2B show so-called black matrix structures, while FIG. 2C shows a so-called black stripe structure. On the face plate, an electroconductive film (so-called metal back) 1009 is also located on the phosphors, but for the sake of explanation this is omitted in FIGS. 2A to 2C.

FIG. 8B is a schematic view of a face plate with a multi-layer electroconductive film (metal back), indicated by the hatched area in the figure, covering the patterned phosphor film 1008 in FIG. 2A. In FIG. 8B, the multi-layer electroconductive film is formed so as to have the same area as the phosphor film 1008, but the area of the electroconductive film may also be larger than that of the phosphor film 1008, or may be smaller than that of the phosphor film 1008.

Below, an example of the manufacturing method of the present invention will be described using FIG. 1, FIGS. 6A and 6B to FIGS. 8A and 8B. Here, an example will be described in which a phosphor film with the pattern shown in FIG. 2A is created.

(Step A) First, a substrate (face plate) 1012 with a first principal surface and a second principal surface is prepared. Here, soda lime glass plate is used for the face plate. However, the face plate material is not restricted to this, and various other optically transparent insulating materials can be used.

Figure 6A:
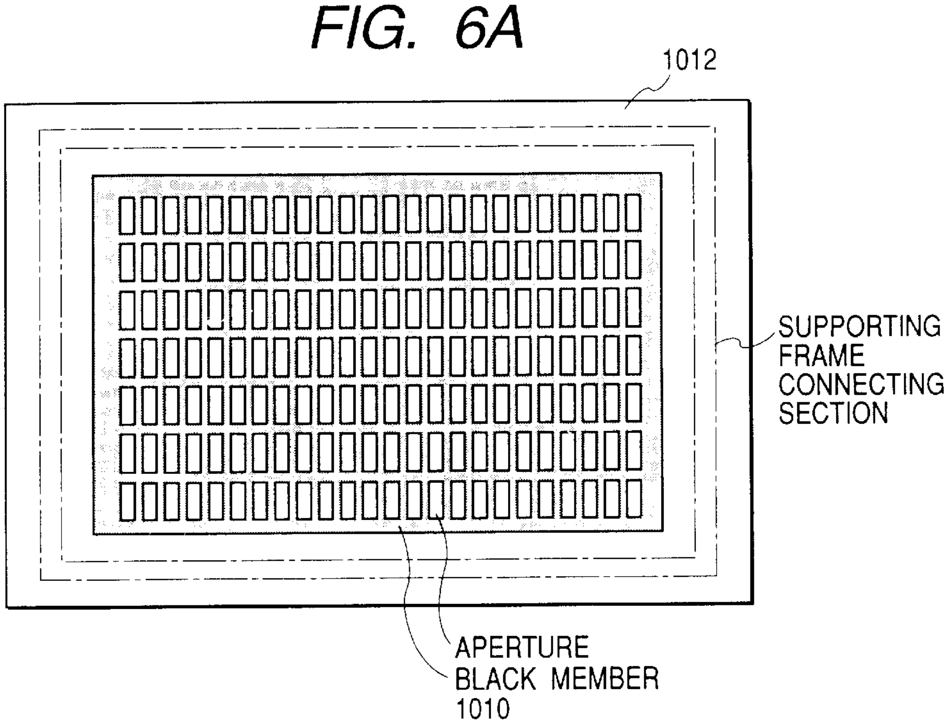
FIGS. 6A and 6B are schematic views of parts of the manufacturing process for the face plate of the present invention.

(Step B) Next, the above described face plate is washed and dried as necessary, and then a black paste containing glass particles and a black pigments is formed on the surface of the face plate (the first principal surface) so as to have apertures in a matrix shape, for example (FIG. 6A).

For example, when forming the matrix-shaped black member 1010 shown in FIG. 2A, a pattern with 240 stripes with a width of 100 [μm] and a pitch of 290 [μm] extending in the vertical direction (Y direction), and 720 stripes with a width of 300 [μm] and a pitch of 650 [μm] extending in the horizontal direction (X direction), is created with a thickness of 20 [μm] both vertically and horizontally by screen printing. By executing formation in this way, a black member 1010 with a so-called black matrix structure is formed (FIG. 6A).

The width and pitch values given above are only examples, and these values can be changed arbitrarily.

In the present embodiment, the black member 1010 is formed with screen printing, but this is not, of course, a limitation, and photolithography can also be used, for example. However, as the film is thick, and from the viewpoint of cost, the use of a printing method is desirable.

A black paste containing glass particles and a black pigments is used as the material of the black member 1010, but this is not, of course, a limitation. It is also possible to use carbon black, etc., for example, but here, the above described black paste is used because screen printing is used and a thick (20 [μm]) film is formed.

Here, the black member 1010 is created in a matrix shape as shown in FIG. 2A, but this is not, of course, a limitation, and a different arrangement can also be used, such as a delta-shaped arrangement as shown in FIG. 2B, or a stripe arrangement as shown in FIG. 2C.

Figure 6B:
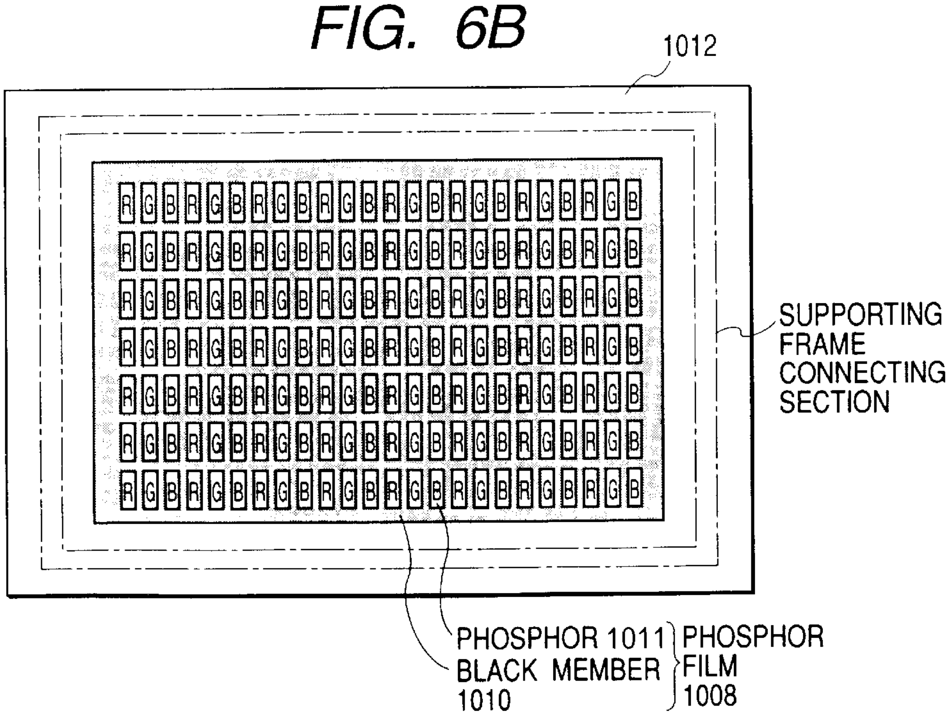

(Step C) Next, as the phosphor forming step relating to the present invention, the apertures in the black member 1010 are filled in with red, blue, and green phosphors by means of screen printing, as shown in FIG. 6B.

In the present embodiment, the phosphors are laid out using screen printing, but this is not, of course, a limitation, and a method such as photolithography can also be used, for example.

The phosphors used here are those of P22 used in the field of CRT and red ($Y_2O_2S$: $Eu^{3+}$), blue (ZnS: Ag, Al), and green (ZnS: Cu, Al), with an average particle diameter of 7 [$\mu$m] (median diameter Dmed). However, this is not, of course, a limitation, and other phosphors can also be used.

The film thickness of the phosphors is made about 20 [$\mu$m] on average. Here, if the film thickness of the phosphors is not sufficiently even, it is possible to provide nonwoven fabric that has absorbed isopropyl alcohol (IPA) on plate glass that has a sufficient degree of flatness, and by this means apply pressure to the phosphors 1011 and black member 1010 on the face plate, and increase the flatness.

(Step D) Next, by baking this substrate for 4 hours at 450 [° C.], the resin component contained in the paste is thermally decomposed and eliminated, and a phosphor film 1008 is obtained with a 10-inch diagonal screen size, an aspect ratio of 4:3, and a 120×240 pixel. In the present invention, "phosphor film" denotes a film consisting of the above described phosphors 1011 and black member 1010, placed on the first principal surface of the face plate 1012.

Next, an example of the method of creating a first electroconductive film relating to the present invention on this phosphor film 1008 will be described.

(Step E) A face plate 1012 with a phosphor film 1008 created as described above is placed on a spin-coater, a solution of colloidal silica in pure water is applied while the substrate is rotated, and the irregularities of the phosphor film 1008 are wetted.

Figure 7A:
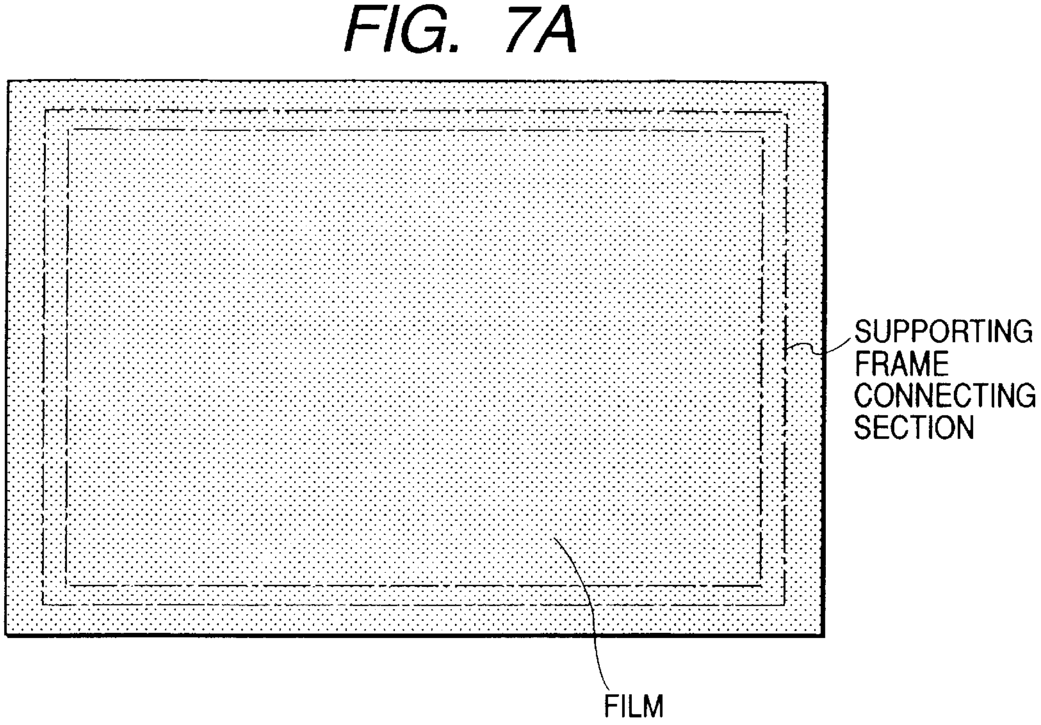
FIGS. 7A and 7B are schematic views of parts of the manufacturing process for the face plate of the present invention.

(Step F) As the filming step relating to the present invention, a solution of polymethacrylate in toluene is applied by spraying to the entire surface while the substrate is rotated, drying is carried out by blowing hot air onto the substrate, and a resin film is formed on the phosphors 1011 and black member 1010 configuring the phosphor film 1008, thereby performing flattening of the surface of the phosphor film 1008 (FIG. 7A).

Here, as the flattening step, a solution of polymethacrylate in toluene is applied after wetting the phosphor film 1008, but this is not, of course, a limitation, and another solvent type lacquer liquid can also be used, or, as another method, a step can be performed whereby, for example, an acrylic emulsion is applied to the phosphor and dried.

Figure 7B:
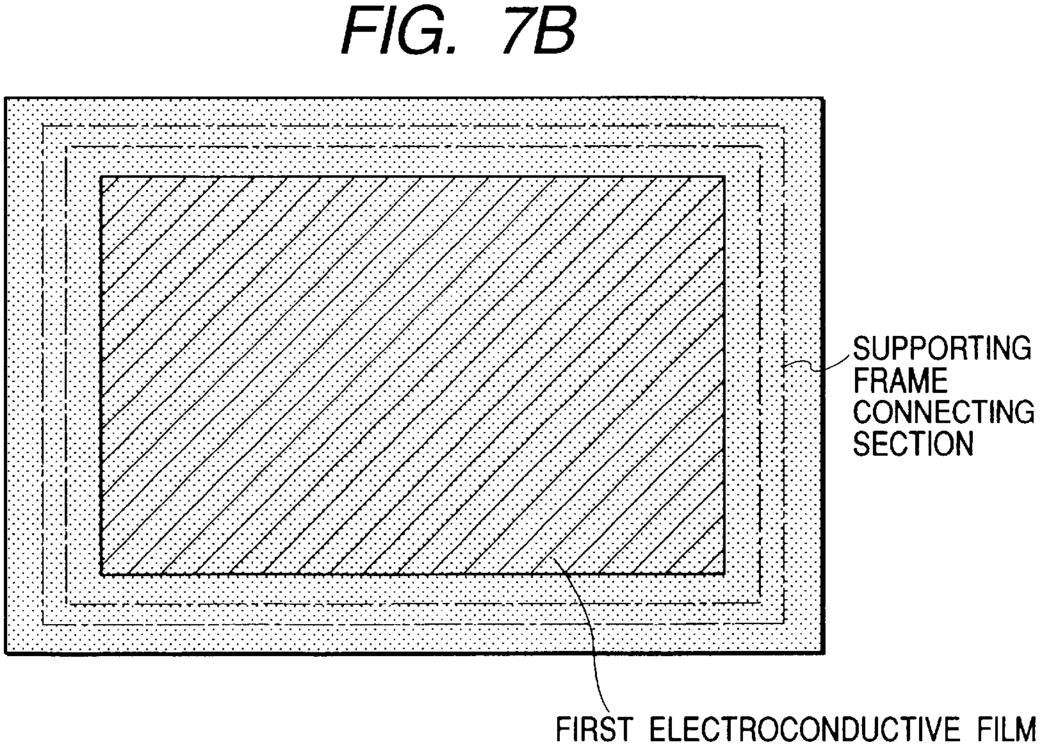

(Step G) Next, a 20-nanometer thick aluminum film is deposited by vacuum evaporation, as the first electroconductive film relating to the present invention, on the resin film (FIG. 7B).

(Step H) Next, as the baking step relating to the present invention, this face plate is conveyed into a baking oven, the resin film is thermally decomposed and eliminated by baking to 450 [° C.], and the first electroconductive film is placed on the phosphor film 1008 (FIG. 8A). The above described baking temperature is set appropriately according to the resin film material used.

Figure 1A:
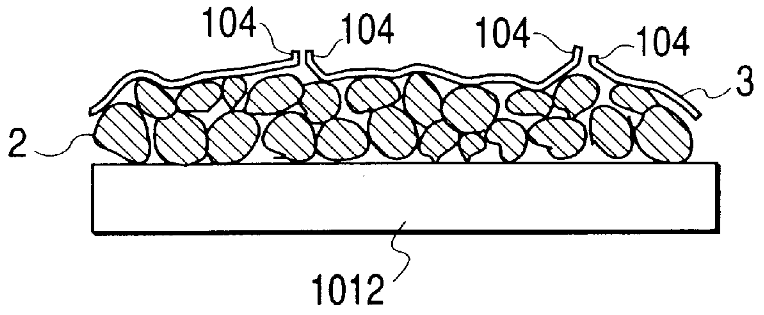
FIGS. 1A, 1B, and 1C are schematic views of an example of the manufacturing process for the face plate of the present invention.
Figure 1B:
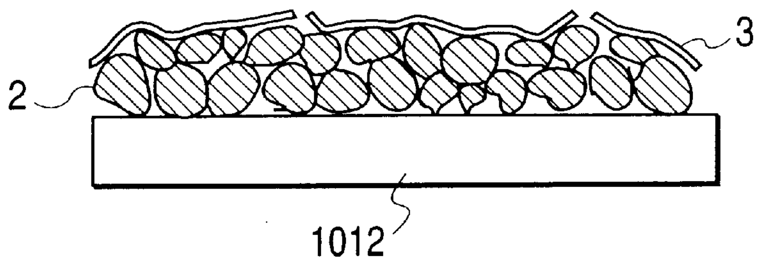
Figure 1C:
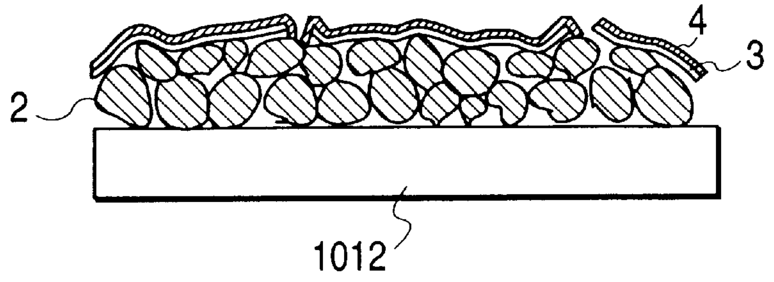

Looking at a cross section of part of a face plate created by the same kind of steps as above described steps (A) to (H), holes have been made at various places in the first electroconductive film 3, as shown in FIG. 1A. In FIGS. 1A to 1C, reference numeral 1012 denotes the face plate, reference numeral 2 denotes phosphor particles, reference numeral 3 denotes the first electroconductive film, and reference numeral 4 denotes the second electroconductive film. These holes are presumed to be holes formed in the above described baking step of step H. Around these holes, protrusions 104 have been formed, as shown in FIG. 1A.

Figure 9:
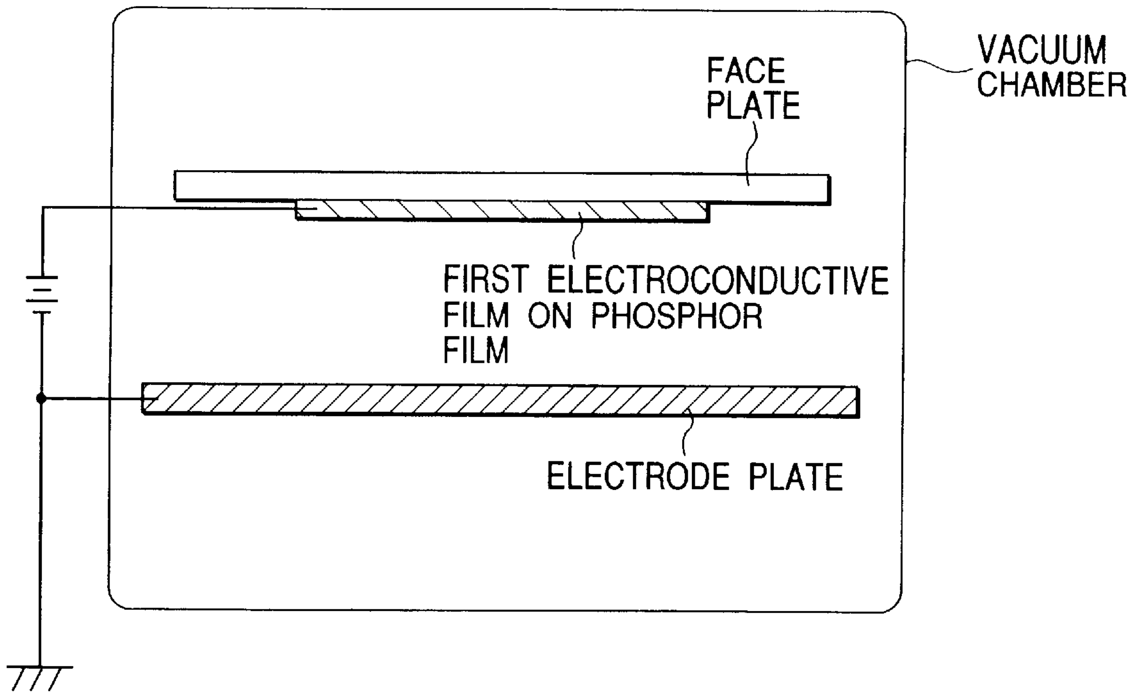
FIG. 9 is a schematic view of part of the manufacturing process for the face plate of the present invention.

(Step I) Next, a "voltage application step" is carried out on the face plate on which step H was carried out. In a vacuum chamber, the first principal surface of the face plate is placed opposite an electrode plate with an area considerably larger than that of the above described first principal surface, as shown in FIG. 9. At this time, the first principal surface of the face plate and the surface of the above described electrode plate are fixed with a given gap between them. Then, a voltage (electric field) is applied to the first electroconductive film.

The voltage applied between the above described electrode plate and first electroconductive film in this "voltage application step" is preferably to be equal to or greater than the voltage applied between the electroconductive film (metal back) 1009 and rear plate (wiring 1003 or 1004) in the image-forming apparatus shown in FIG. 3. In other words, the voltage applied between the above described electrode plate and first electroconductive film is to be equal to or greater than the voltage defined by the difference between the potential applied to the electroconductive film (metal back) and the potential effectively applied to the electron-emitting devices when the apparatus is driven as an image-forming apparatus.

The strength of the field applied between the above described electrode plate and first electroconductive film in the above described "voltage application step" is preferably to be set to a field strength equal to or greater than that of the field strength applied between the electroconductive film (metal back) 1009 and rear plate (wiring 1003 or 1004) in the image-forming apparatus shown in FIG. 3. In other words, the strength of the electric field applied between the above described electrode plate and first electroconductive film is preferably to be set equal to or greater than the strength of the electric field applied between the electroconductive film (metal back) and the electron-emitting devices when the apparatus is driven as an image-forming apparatus.

The "strength of the electric field applied between the electrode plate and first electroconductive film" mentioned here is the value obtained by dividing the value of the voltage applied between the above described electrode plate and first electroconductive film (first principal surface of the face plate) by the distance between the above described electrode plate and first electroconductive film.

Also, with the present invention, even if a voltage (field strength) lower than the above described voltage (field strength) is used to in order to form the second electroconductive film described later, the effects of the present invention can still be achieved as long as the above described "voltage application step" is carried out.

Looking at a cross section of part of a face plate created by the same kind of steps as above described steps (A) to (I), holes have been made at various places in the first electroconductive film 3, as shown in FIG. 1B. Around these holes, however, the protrusions 104 observed in step (H) have been eliminated or lessened. This is presumed to be because, by means of the "voltage application step", the electric field has been concentrated at the protrusions 104 whose structure makes them susceptible to concentration of an electric field, and as a result, the protrusions have been eliminated by discharge, field evaporation, etc., originating at the protrusions 104.

When protrusions are eliminated by such discharge, field evaporation, etc., it is also effective to set the resistance value of the electrode plate located opposite the face plate in the above described "voltage application step" so that elimination is not performed on a larger scale than necessary. In particular, with a sheet resistance, an insulating substrate such as glass on which a film with a sheet resistance value between 1 kΩ/□ and 1 MΩ/□ is formed is used as the above described electrode plate. By so doing, it is possible to prevent elimination from being performed on a larger scale than necessary.

(Step J) Next, a 20-nanometer thick aluminum film is put onto the above described first electroconductive film 3 as the second electroconductive film 4 (FIG. 8B). Of course, the second electroconductive film 4 created here is not limited to an aluminum film, and any electroconductive film of the appropriate thickness can be used instead.

Looking at a cross section of part of a face plate created by the same kind of steps as above described steps (A) to (J), the shape is as shown in FIG. 1C. That is, holes made at various places in the first electroconductive film 3 have been reduced in number by being covered with the second electroconductive film 4. Also, even where holes remain, the area around those holes has been covered with the second electroconductive film 4, and therefore the hole diameter has been reduced and the shape of the periphery of the holes has become less severe, and the shape is such that field concentration is drastically reduced compared with the periphery of the holes observed in the first electroconductive film 3 after step (I) was carried out.

An airtight container 1100 is assembled by sealing the connecting sections of the face plate 1012 formed by above method, the rear plate 1001 on which the above described electron-emitting devices 1002 are formed in an array, and the supporting frame 1006, by means of a bonding material such as frit glass, and then the interior of the airtight container is exhausted to $10^{-7}$ Pa via an exhaust pipe (not shown in the drawing). The exhaust pipe is then sealed. This step completes the creation of a vacuum airtight container. Here, an example is shown in which the interior of the airtight container is exhausted via an exhaust pipe, but if the above described sealing is performed in a vacuum chamber, it is possible to omit the exhaust pipe and exhaust pipe sealing step, and therefore this is desirable.

N×M surface conduction electron-emitting devices 1002 are formed on the rear plate 1001 of the present embodiment.

Here, the above mentioned N and M are positive integers greater than 1, that are set appropriately according to the target number of display pixels.

These N×M surface conduction electron-emitting devices 1002 are simple-matrix-wired by means of M row-directional wires 1003 and N column-directional wires 1004. The section configured by the substrate 1001, surface conduction electron-emitting devices 1002, row-directional wiring 1003, and column-directional wiring 1004, is called a multi-electron-beam source, used in one embodiment of an image display apparatus relating to the present invention.

Dx1 to Dxm, Dy1 to Dyn, and Hv, are electrical connection terminals of an airtight structure provided to electrically connect the relevant display panel (vacuum airtight container) to electrical circuitry not shown in the drawing.

Dx1 to Dxm are electrically connected to the row-directional wiring 1003 of the multi-electron-beam source, Dy1 to Dyn are electrically connected to the column-directional wiring 1004 of the multi-electron-beam source, and Hv is electrically connected to the metal back 1009 of the face plate 1012.

Next, as the electron-emitting devices that configure the multi-electron-beam source used in an image display apparatus relating to the present invention, it is possible to use not only the above described surface conduction electron-emitting devices, but also, preferably, field emitters, cold cathodes such as MIM (metal layer/insulation layer/metal layer) type electron-emitting devices, or thermionic cathodes. From the viewpoint of simplicity of the manufacturing process, power consumption, and so forth, cold cathodes are desirable, and moreover, field emitters or surface conduction electron-emitting devices are more desirable.

According to the above described embodiment of an image-forming apparatus using the manufacturing method of the present invention, even when a high voltage is applied to the metal back 1009, peeling of the metal back 1009 is suppressed, and an image display apparatus with high image quality and high brightness can be provided.

Here, the metal back is configured by first and second electroconductive films, but it is also possible for the metal back to be configured by three or more electroconductive film layers. Also, each electroconductive film layer can be of a different material. Moreover, in order to maintain the degree of vacuum inside the airtight container 1100, it is desirable for a film consisting of getter material to be used as the above described second electroconductive film (the electroconductive film located closest to the rear plate). In this case, a Ba film is desirable as the film consisting of getter material.

An example of the present invention will now be described in detail below.

Embodiment 1

Figure 10:
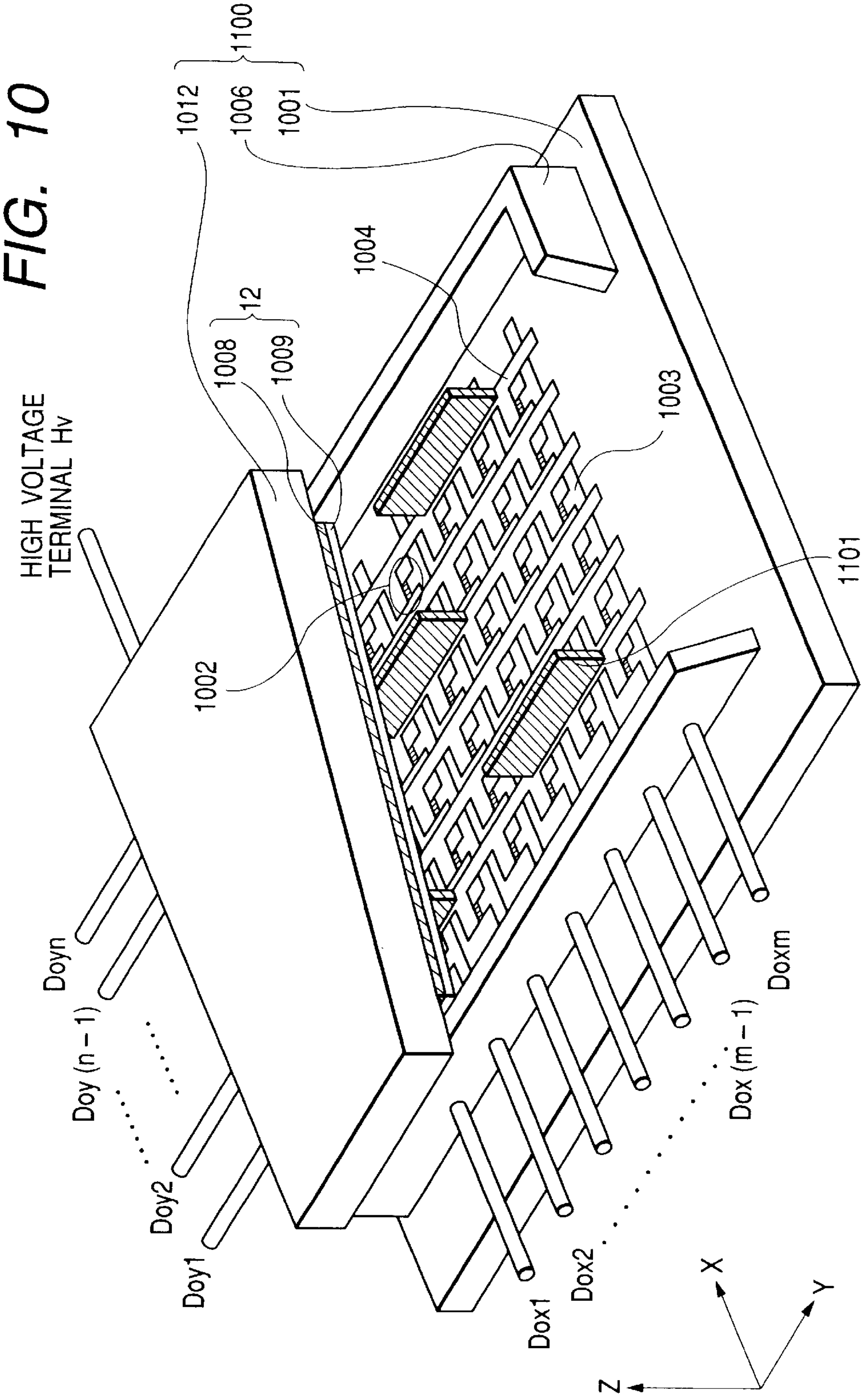
FIG. 10 is a schematic perspective view of another example of an the image display apparatus to which the present invention is preferably to be applied.

An image-forming apparatus formed as the present embodiment is shown in FIG. 10. In FIG. 10, reference numeral 1001 denotes the rear plate on which surface conduction electron-emitting devices 1002 are arranged, reference numerals 1003 and 1004 denote wiring connected to the individual electron-emitting devices, reference numeral 1006 denotes the supporting frame, reference numeral 1012 denotes the face plate, and reference numeral 1101 denotes a spacer. The face plate 1012, supporting frame 1006, and rear plate 1001 configure an airtight container 1100 whose interior is maintained in a reduced pressure state. Spacers are located inside the airtight container 1100 to prevent the container from being crushed by atmospheric pressure. On the face plate are located image forming members consisting of the above described phosphor film 1008 and metal back 1009. Dox1 to Doxm are terminals for applying a voltage to the above described wiring 1003 from outside the airtight container 1100. Similarly, Doyl to Doyn are terminals for applying a voltage to the above described wiring 1004 from outside the airtight container 1100. The metal back is connected to a high voltage terminal Hv, and has a potential of 10 kV applied to it.

Figure 11A:
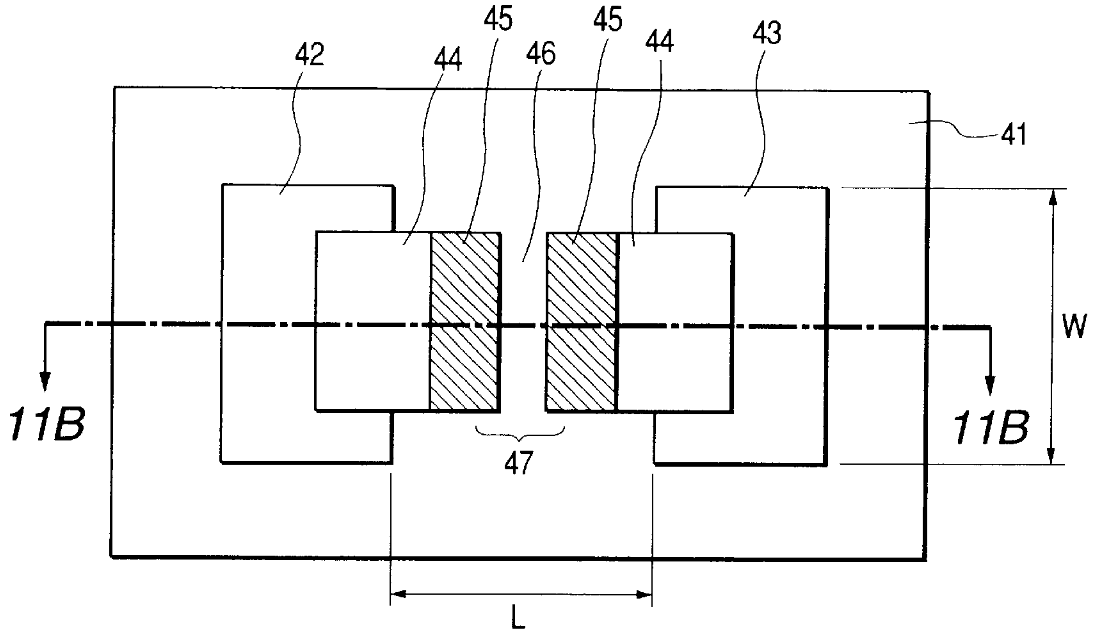
FIGS. 11A and 11B are schematic views of a surface conduction electron-emitting device preferably to be applied in the present invention.
Figure 11B:
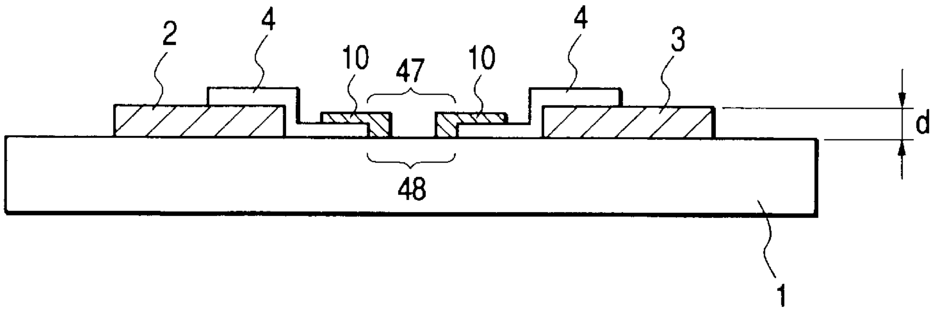

FIG. 11A is a schematic top-view of an elctron-emitting device used to the present embodiment, and FIG. 11B is a schematic cross-sectional view through line 11B—11B in FIG. 11A. FIGS. 12A to 12F are schematic views of parts of the forming steps when the above described electron-emitting devices are formed on the rear plate.

The image display apparatus manufacturing method of the present embodiment will now be described.

First, the rear plate forming steps will be described.

Figure 12A:
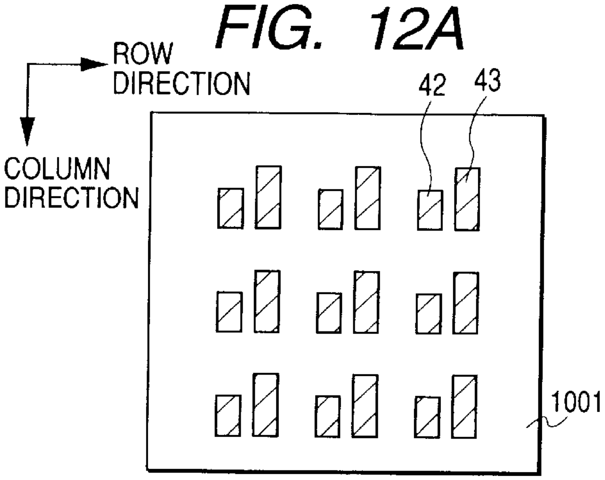
FIGS. 12A, 12B, 12C, 12D, 12E, and 12F are schematic views of parts of the manufacturing process for the rear plate of the present invention.

(Step 1) First the rear plate 1001 consisting of a glass plate is thoroughly washed and dried. Then the pairs of electrodes 42 and 43 configuring the individual electron-emitting devices are formed as 1,000 pairs in the column direction and 5,000 pairs in the row direction (FIG. 12A). For purposes of explanation, FIGS. 12A to 12F show three pairs in the column direction and three pairs in the row direction.

Figure 12D:
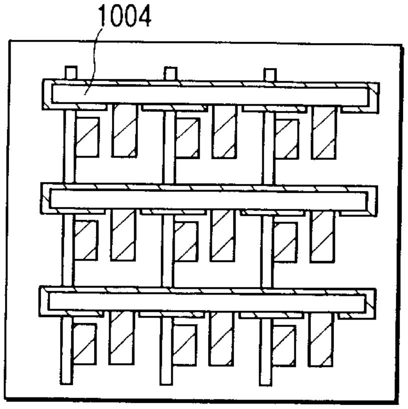
Figure 12B:
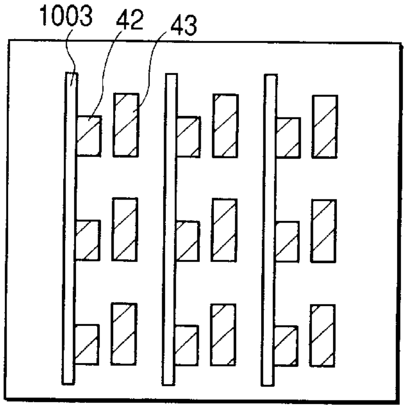

(Step 2) Next, 5,000 column-directional wires 1003 connecting the electrodes 42 in common are formed by screen printing (FIG. 12B).

Figure 12E:
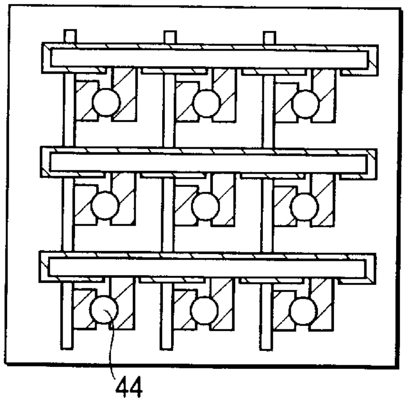
Figure 12C:
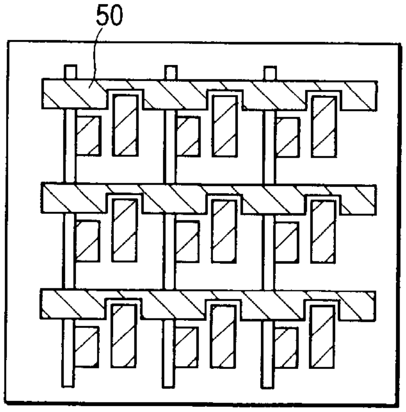

(Step 3) 1,000 insulation layers 50 are formed by screen printing at right angles to the column-directional wiring (FIG. 12C).

(Step 4) Next, 1,000 row-directional wires 1004 are formed by screen printing on the insulation layers 50 (FIG. 12D). At this time, the above described row-directional wiring and electrodes 43 are connected through apertures formed beforehand in the insulation layers 50.

(Step 5) An electroconductive film 44 is formed by supplying an organometallic complex by an ink jet method, and baking it, so as to interconnect each of the electrode pairs 42 and 43 (FIG. 12E).

(Step 6) Next, the rear plate for which above described steps 1 to 5 have been completed is placed in a vacuum chamber. A current is then passed through the wiring 1003 and 1004 to each electroconductive film 44, and a gap 48 is formed in each electroconductive film 44.

Figure 12F:
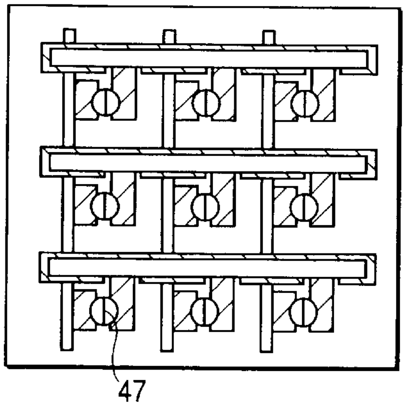
Figure 13:
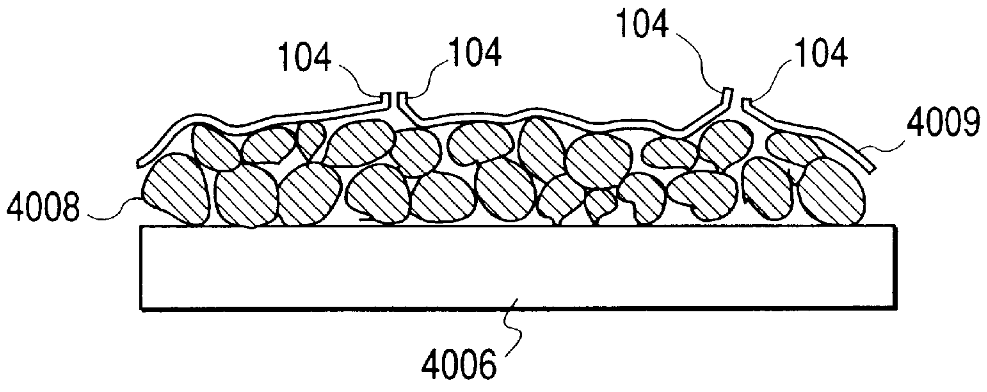
FIG. 13 is a schematic cross-sectional view of a conventional face plate.

(Step 7) Following this, a carbon compound gas is introduced into the chamber, a current is passed through the wiring 1003 and 1004 to each electroconductive film 44, a carbon film 10 is formed at each gap 48, and an electron-emitting region 47 is formed (FIG. 12F).

The rear plate is formed by means of the above steps. Nine rear plates are created by the above described steps.

Next, the face plate forming steps will be described.

(Step 8) A face plate 1012 consisting of a glass plate of the same material as the rear plate is prepared, and is thoroughly washed and dried.

(Step 9) Using a printing method, a black member 1010 is formed in a matrix shape on the first principal surface of the face plate (FIG. 6A).

(Step 10) Using a printing method, the apertures in the above described black member 1010 are filled in with phosphors emitting the three primary colors R (red), G (green), and B (blue), in the kind of arrangement shown in FIG. 6B.

(Step 11) A filming step is carried out on the first principal surface of the face plate, on which is located a phosphor film 1008 consisting of the above described phosphors and black member. As the filming step in the present embodiment, after the phosphor film 1008 has been wetted, a solution of polymethacrylate in toluene is applied by spin-coating while the substrate is rotated, and dried. By means of this step, the surfaces of the phosphors 1011 and black member 1010 configuring the phosphor film 1008 are coated with resin film and flattened (FIG. 7A).

(Step 12) Aluminum is evaporated to a thickness of 50 nanometers on the above described resin film as the first electroconductive film. Here, the first electroconductive film is formed in essentially the same pattern as the above described phosphor film 1008.

(Step 13) The above described resin film is baked and eliminated, and the phosphor film 1008 is covered with the first electroconductive film (FIG. 1A, FIG. 8A).

Ten face plates are formed by means of the above steps 8 to 13.

(Step 14) Next, as shown in FIG. 9, each of the ten face plates that have undergone the above described steps 8 to 13 is placed opposite and at a distance from an electrode plate in a pressure reduced atmosphere, and a "voltage application step" is carried out in which a voltage is applied between the first electroconductive film and the electrode plate. A 1 [Hz] rectangular wave is applied with a 200 [ms] pulse width, at a rate of 10 [V/s], until a wave height value of 25 [kV] is reached. In the present embodiment, the degree of vacuum inside the vacuum chamber shown in FIG. 9 is $10^{-7}$ Pa.

Here, the voltage applied to the above described first electroconductive film is gradually raised, the voltage at which discharge starts between the above described electrode plate and the first electroconductive film is measured, and the field strength between the face plate and the electrode plate at this time (hereafter called the "discharge starting field strength") is found.

Under the conditions according to the above described "voltage application step", many of the ten face plates produced a discharge phenomenon at a voltage up to 25 kV, but a discharge phenomenon was not measured for the remaining few face plates.

Here, the above described "field strength" is taken to be the result of dividing the voltage applied between the first electroconductive film and the electrode plate positioned opposite the face plate, by the distance of the gap between the electrode plate and the face plate. The results of this measurement show that the lowest "discharge starting field strength" of the ten face plates created in the present embodiment is 10 [kV/mm].

When a second voltage application step identical to the above described "voltage application step" is carried out on the face plate showing the lowest "discharge starting field strength" in the above described "voltage application step", the "discharge starting field strength" (discharge starting voltage) rises. This is presumed to be because protrusions arising in the first electroconductive film due to the baking step for the above described resin film, places on the verge of peeling on the first electroconductive film, and the like, are eliminated by the above described "voltage application step".

(Step 15) Next, a second electroconductive film forming step is carried out on the remaining nine face plates on which the above described second voltage application step was not carried out. To be specific, in the present embodiment, a 50-nanometer thickness aluminum film is deposited onto the above described first electroconductive film as a second electroconductive film by vacuum deposition (FIG. 8B). Of course, the second electroconductive film is not restricted to the above described conditions, and any electroconductive film of the appropriate thickness can be used instead.

Spacers 1101 and a supporting frame 1006 are placed between the face plate 1012 created in this way and the above described rear plate so that the distance between the face plate and the rear plate is 1.5 mm, and sealed with a connecting member, forming an airtight container 1100 (FIG. 10). Then, a driver (not shown in the drawing) is connected to this airtight container 1100 to make an image display apparatus, and a voltage of 10 kV is applied, with respect to the above described rear plate, to the metal back (first and second electroconductive films), and driving is performed over a long period. Even when observing the display of an all-black image, a stable display image is obtained with no sign whatever of the occurrence of light emission. Also, the results of analysis and investigation show no deposition of aluminum on the rear plate side, and in observation of the face plate, no sign of places where new peeling seems likely to occur. In addition, when displaying a video image, a high-quality, high-resolution, and stable image can be displayed over a long period.

For comparison, in the above described embodiment, an image display apparatus on which step 14 alone was not carried out was created, and when driven in the same way as the above described embodiment, no light emission was observed by the naked eye with all-black display even with a field strength of 10 [kV/mm] or less. However, in observation over a long period using a high-sensitivity CCD, light emission was observed at a rate of several times per hour.

Further, an image display apparatus similar to the above described embodiment was created using a face plate for which, after evaporation of a 100 nm aluminum film as the first electroconductive film in the above described step 12, only a step of the same kind as the above described step 13 was carried out, and when similarly driven, a phenomenon appearing to be discharge was visually confirmed. Also, analysis of this image display apparatus shows many places where aluminum is adhering to the rear plate side.

Thus, according to the present invention, because, after a first electroconductive film as an electroconductive film (metal back) that covers a phosphor film is formed on the face plate and this first electroconductive film is exposed to a high electric field, a film is further used whereby the first electroconductive film is covered with a second electroconductive film, it is possible to prevent peeling of the metal back, and to prevent a decrease in image quality, even when a high voltage is applied between the metal back and the rear plate.

As described above, according to the present invention, a sufficiently high voltage can be applied to the metal back, and a bright, high-resolution image-forming apparatus with good image quality can be provided in a slim form.

What is claimed is:

1. A manufacturing method for an image display apparatus that comprises a first substrate, a second substrate located at a distance from and opposite said first substrate, electron-emitting devices arranged on a principal surface of said first substrate, a phosphor film, and an electroconductive film covering that phosphor film, wherein said phosphor film and said electroconductive film are located on a principal surface of said second substrate so as to be opposite said electron-emitting devices, said method comprising the following steps of:

(A) forming said phosphor film on the principal surface of said second substrate;

(B) forming a first electroconductive film covering said phosphor film;

(C) placing an electrode at a distance from said first electroconductive film;

(D) applying a voltage between said first electroconductive film and said electrode; and (E) forming a second electroconductive film on said first electroconductive film.

2. The manufacturing method for an image display apparatus according to claim 1, wherein the step of forming said first electroconductive film further comprises the following steps of:

laying a resin film placed on said phosphor film;

forming a first electroconductive film on said resin film; and eliminating said resin film by baking.

3. The manufacturing method for an image display apparatus according to claim 1 or 2, wherein the voltage applied between said first electroconductive film and said electrode is equal to or greater than the voltage applied between said electron-emitting devices and said electroconductive film when said image display apparatus is driven.

4. The manufacturing method for an image display apparatus according to claim 1 or 2, wherein the strength of the field generated when a voltage is applied between said first electroconductive film and said electrode is equal to or greater than the strength of the field applied between said electron-emitting devices and said electroconductive film when said image display apparatus is driven.

* * * * *

UNITED STATES PATENT AND TRADEMARK OFFICE

CERTIFICATE OF CORRECTION

PATENT NO. : 6,604,972 B1
DATED : August 12, 2003
INVENTOR(S) : Akihiko Yamano

It is certified that error appears in the above-identified patent and that said Letters Patent is hereby corrected as shown below:

Title page,
Item [57], ABSTRACT,
Line 17, "from-the" should read -- from the --.

Column 1,
Lines 40 and 43, "elctron-emitting" should read -- electron-emitting --.

Column 7,
Line 21, "120x240" should read -- 720x240 --.

Column 10,
Line 50, "elctron-emitting" should read -- electron-emitting --.

Signed and Sealed this

Third Day of February, 2004

JON W. DUDAS
*Acting Director of the United States Patent and Trademark Office*